May 19, 1925.  J. P. RATIGAN  1,538,259
GRIP
Filed June 21, 1924
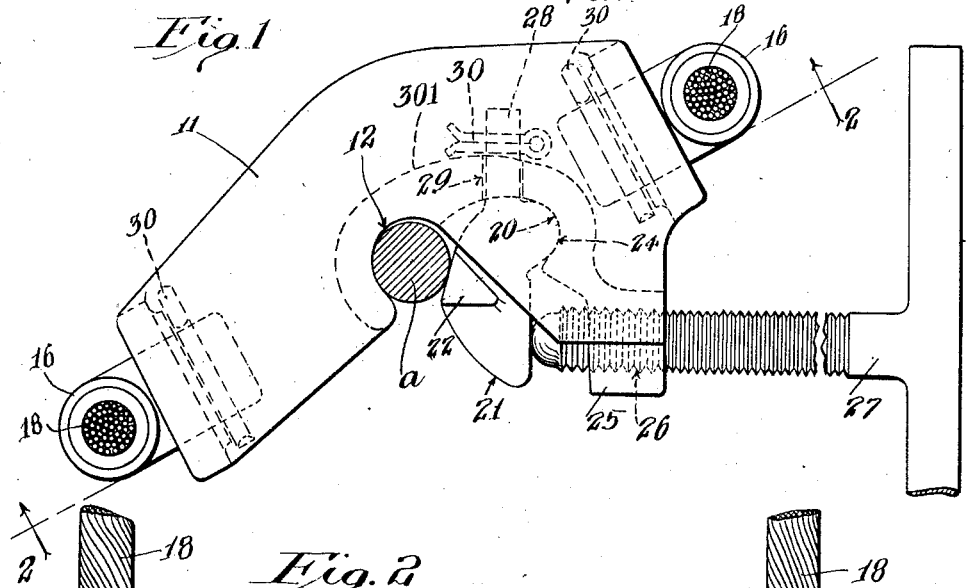
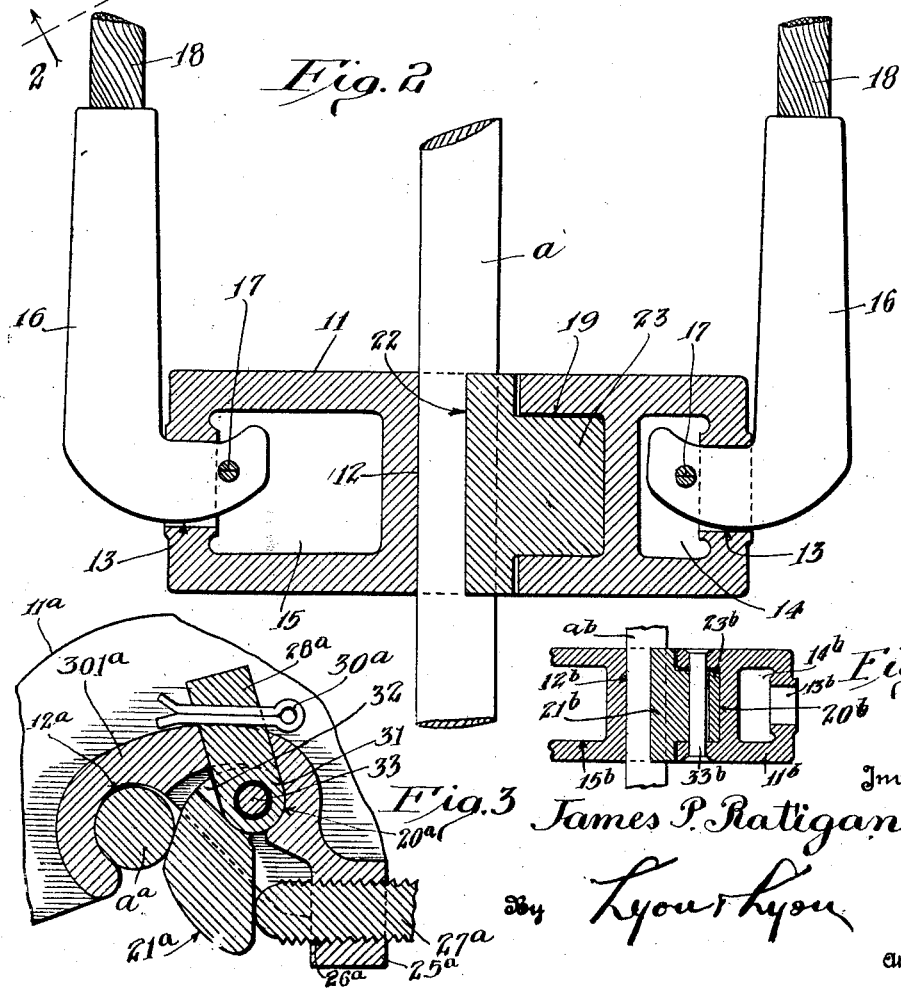
Inventor
James P. Ratigan
By Lyon & Lyon
Attorneys Patented May 19, 1925.

1,538,259

UNITED STATES PATENT OFFICE.

JAMES P. RATIGAN, OF HUNTINGTON PARK, CALIFORNIA.

GRIP.

Application filed June 21, 1924. Serial No. 721,607.

*To all whom it may concern:*

Be it known that I, JAMES P. RATIGAN, a citizen of the United States, residing at Huntington Park, in the county of Los Angeles and State of California, have invented a new and useful Grip, of which the following is a specification.

This invention relates to grips of the character employed for holding sucker lines and the like in the art relating to oil well tools.

An object of the invention is to make provision for multiplying the pressure exerted upon the pressure-applying member so as to more effectually clamp the polish rod in the grip.

Another object is to effect the multiplication of pressure in a simple manner so that the operations of clamping and unclamping the polish rod are quickly effected.

Another object is to provide for fulcruming of the pressure block in the grip body, independently of means for retaining the pressure block in operative relation with the grip body.

Another object is to provide the grip with novel suspension means.

Another object is to provide for quick attaching of the suspension means to the grip body and detaching therefrom.

A further object is to provide a grip of this character of great compactness and strength.

The accompanying drawings illustrate the invention in several of its forms:

Fig. 1 is a plan view of a grip constructed in accordance with the provisions of this invention, the suspension cables being in section and a portion of the clamping screw being broken away to contract the view. A polish rod, shown in cross section, is clamped in the grip.

Fig. 2 is a sectional elevation on the line indicated by 2—2, Fig. 1.

Fig. 3 is a fragmental plan section of another form of grip embodying the invention.

Fig. 4 is a sectional elevation, similar to Fig. 2, of a still different form of grip embodying the invention, the suspension links being omitted.

The form of the invention shown in Figs. 1 and 2 of the drawings will first be described:

There is provided an elongate angular body 11 having in one side a recess 12; the inner wall of which is concave. This recess 12 will accommodate several sizes of polish rods. A polish rod is indicated at $a$ within the recess. A plane passing longitudinally of the body 11 through the axis of the recess 12 coincides with the axes of holes 13 which respectively open from the ends of the body into cavities 14, 15 in the end portions of the body.

Hook-shaped links 16 extend through the holes 13 into the cavities 14, 15. The hook shape of the links 16 tends to prevent said hooks from pulling out of the holes 13, and to further insure against this pulling out the tips of the hooks 16 are provided with transversely extending cotter pins 17 which prevent withdrawal of the links 16 by bearing against the walls of the cavities 14, 15. Suspension cables 18 are secured in the links 16 by any of the usual means employed in such connections. The openings 13 are approximately the same distance from the axis of the recess 12, and, accordingly, the grip will be nicely balanced upon the links 16 when the weight of the sucker line is imposed upon said grip.

The body 11 is provided opposite to the recess 12 with a slot 19 having a concave wall portion 20 which constitutes a fulcrum for a pressure block 21. A portion 22 of the pressure block 21 is flush with the upper and lower faces of the body 11 and lies external of the slot 19, and another portion constitutes a tongue 23 that extends into the slot 19 and said portion 23 is provided with a convex face 24 fitting and fulcrumed against the concave face 20.

The portion 22 of the block is positioned at the mouth of the recess 12 so as to engage the outer face of the polish rod $a$ when said polish rod is in the recess, thus to force the polish rod against the inner curved wall 20 of said recess.

An arm 25 of the body 11 extends at an acute angle to the plane in which lie the axes of the recess 12 and holes 13, and extending transversely in said arm 25 is a hole 26 in which is screw-threaded a clamping screw 27. The inner end of the clamping screw 27 bears against the pressure block 21 near the outer end thereof. the fulcrum 20, axis of the recess 12, and bearing point of the screw 27 upon the block 21, if connected by lines, would constitute the points of a triangle, the axis of the recess 12 being between the fulcrum 20 and bearing point of the screw 27. Thus, when the screw 27 is tightened, it causes considerable leverage to be exerted by the block 21 against the polish rod $a$. In fact the pressure block 21 constitutes a lever of the second class.

While it is unnecessary to provide means for retaining the pressure block 21 in place when the clamping screw 27 is loosened, it is preferable in tools of this character to provide against falling apart of the different elements of the tool when the tool is released so as to guard against their misplacement and loss. Accordingly, in this device means are provided for retaining the block 21 against falling away from the body 11 when the clamping screw 27 is loosened. In the particular instance illustrated in Fig. 1, a portion of the block 21 constitutes a finger 28 which passes through a hole 29 in the rear wall of the slot 19, and extending transversely through the projecting end of the finger 28 is a cotter pin 30 which bears against the outer face of the slot wall 301. The finger 28 fits loosely in the slot 29 so that pivotal motion of the block 21 upon its fulcrum 20 can take place for the clamping and unclamping motions of the block with respect to the polish rod $a$.

The foregoing will make clear the construction and operation of the invention and it will be readily understood that, in actual practice, to effect clamping of the polish rod, the screw 27 being retracted, the body 11 will be moved into position to receive the polish rod in the recess 12, said polish rod easily passing between the body 11 and the block 21. After the polish rod is in the recess, the screw 27 will be turned to force the block 21 against the polish rod and the polish rod against the inner curved face of the recess 12. It will be noted that the reaction forces, due to the pressure of the screw 27 against the block and the resistance of the polish rod to such pressure, is imposed on the fulcrum 20 and that the fulcrum and that portion of the block bearing against said fulcrum are of massive construction so that breakage of these parts will not occur.

Now considering the form of the invention illustrated in Fig. 3, the parts that function the same as those above described will be indicated by the same reference characters with the addition of the letter exponent "a". It will be noted that, the principal difference in construction between this form of the invention and that previously described, is that in this form the block 21ª is in two parts hingedly connected, the finger 28ª having one member 31 of the hinge and the main portion of the block 21ª having other members 32 of the hinge. Only one of the members 32 can be seen because of the nature of the view. The hinge pin is shown at 33. It will be noted that the hinge pin 33 is loose in the finger 28ª so as to insure that the reaction pressure of the block 21ª will take place against the fulcrum 20ª and not against the pin 33. The operation is the same as above described excepting that the finger 28ª remains stationary when the block 21ª is moved on its fulcrum.

Now referring to the form of the invention illustrated in Fig. 4, parts that functionally correspond to those shown in Figs. 1 to 3 are indicated by the same reference numerals with the addition of the letter exponent "b". In this form the pressure block 21ᵇ is retained in position, when the clamping screw, not shown, but identical with the screw 27 is loosened, by a pin 33ᵇ which is mounted in the body 11ᵇ. The pin 33ᵇ loosely engages the block 21ᵇ so as to insure that the reaction pressure of the block will take place against the fulcrum 20ᵇ and not against the pin.

I claim:

1. A grip of the character described comprising a body having a recess in one side and a slot opposite to the recess, the rear wall portion of the slot being concave, a pressure block projecting into the recess and provided with a convex face fulcrumed against the concave wall portion, and means on the body to force the block about its fulcrum toward the wall of the recess.

2. A grip of the character described comprising a body having a recess in one side and a slot opposite to the recess, the rear wall portion of the slot being concave, a pressure block projecting into the recess and provided with a convex face fulcrumed against the concave wall portion, and a screw in the body to bear against the pressure block, the fulcrum point, the axis of the recess and the bearing point of the screw when connected by lines being at the points of a triangle of which the lines are the sides.

3. A grip of the character described comprising a body having a recess in one side and a slot opposite to the recess, the rear wall portion of the slot being concave, a pressure block projecting into the recess and provided with a convex face fulcrumed against the concave wall portion, means to loosely retain the pressure block in the slot, and a screw in the body to press against the pressure block, the fulcrum point, the axis of the recess and the bearing point of the screw when connected by lines being at the points of a triangle of which the lines are the sides.

4. A grip of the character described comprising a body having a recess in one side and having a concave wall portion, a pressure block provided with a convex face fulcrumed against the concave wall portion, and a screw in the body to bear against the pressure block, the fulcrum point, the axis of the recess and the bearing point of the screw when connected by lines being at the points of a triangle of which the lines are the sides.

5. A grip of the character described comprising a body having a recess in one side and having a concave wall portion, a pressure block provided with a convex face fulcrumed against the concave wall portion, means to loosely retain the pressure block in the slot, and a screw in the body to bear against the pressure block, the fulcrum point, the axis of the recess and the bearing point of the screw when connected by lines being at the points of a triangle of which the lines are the sides.

6. A grip of the character described comprising a body having a recess in one side and a concave wall portion and a hole, a pressure block having a convex portion fulcrumed against the concave wall portion and having a finger at one end loosely engaging the hole, a pin extending transversely through the finger to retain said finger, and means to force the other end of the pressure block toward the recess.

7. A grip of the character described comprising a body having a recess in one side and a concave wall portion and a hole, a pressure block of sectional construction, one section having a convex portion fulcrumed against the concave wall portion and the other section loosely engaging the hole and hinged at one end to the first section, a pin extending transversely through the last section to retain said section, and means to force the other end of the pressure block toward the recess.

8. A grip of the character described comprising a body having a recess in one side and a concave wall portion, a pressure block having a convex portion fulcrumed against the concave wall portion, means including a pin loosely connecting the pressure block to the body, and means to force the free end of the pressure block about its fulcrum toward the recess.

9. A grip of the character described comprising a body having a recess in one side and a slot opposite to the recess, the rear wall portion of the slot being concave, a pressure block projecting into the recess and provided with a convex face fulcrumed against the concave wall portion, means to loosely retain the pressure block in the slot, and means on the body to force the block about its fulcrum toward the wall of the recess.

10. A grip of the character described comprising a body having a recess in one side and having a concave wall portion, a pressure block provided with a convex face fulcrumed against the concave wall portion, and means on the body to force the block about its fulcrum toward the wall of the recess.

11. A grip of the character described comprising a body having a recess in one side and having a concave wall portion, a pressure block provided with a convex face fulcrumed against the concave wall portion, means to loosely retain the pressure block in the recess, and means on the body to force the block about its fulcrum toward the wall of the recess.

12. A grip of the character described comprising a body having a recess in one side to receive the member that is to be clamped, a block fulcrumed opposite to the recess and extending into the recess engageable at an intermediate point with the member that is to be clamped, a screw threaded in the body and bearing against a point near the outer end of the block, the prolonged axis of said screw passing in front of the member that is clamped so that the block will act as a lever against said member.

Signed at Los Angeles, California, this 13th day of June, 1924.

JAMES P. RATIGAN.